Jan. 5, 1932.  A. KENNEDY, JR  1,840,107
SHIP PROPULSION SYSTEM
Filed Nov. 1, 1929

Inventor:
Alexander Kennedy Jr.
by Charles V. Tullar
His Attorney.

Patented Jan. 5, 1932

1,840,107

UNITED STATES PATENT OFFICE

ALEXANDER KENNEDY, JR., OF SCHENECTADY, NEW YORK, ASSIGNOR TO GENERAL ELECTRIC COMPANY, A CORPORATION OF NEW YORK

SHIP PROPULSION SYSTEM

Application filed November 1, 1929. Serial No. 404,111.

My invention relates to power systems and more particularly to power systems suitable for propelling multiple screw ships.

In such systems where a plurality of independently driven generators are used to supply power to a plurality of motors, each of which is connected to a propeller, if, in order to operate the ship at a given speed economically or to cut out a defective generator, several motors are connected to one generator, either the generator or the motors may be overloaded if the prime mover driving the generator is operated at a speed corresponding to that at which it was operated before the connections were changed.

An object of my invention is to provide means associated with the prime movers employed for driving the generators in such systems for limiting the speed of the prime movers and consequently the output of the generators whenever the interconnection of the motors and generators is such that one of the units in the system may be overloaded.

My invention will be better understood from the following description taken in connection with the accompanying drawings and its scope will be pointed out in the appended claims.

Figure 1:
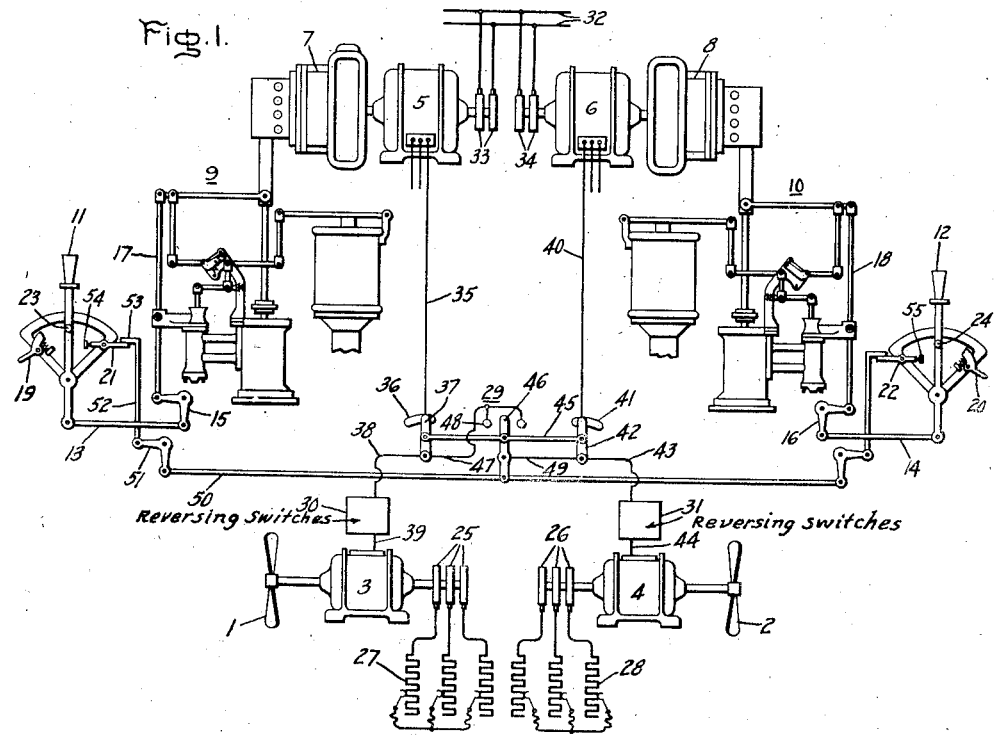
Figure 2:
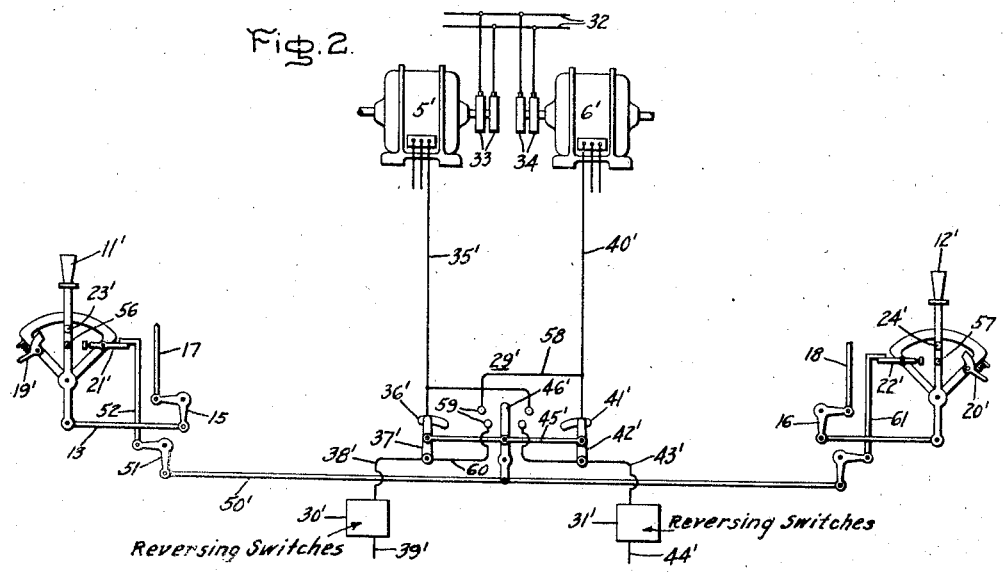

In the drawings, Fig. 1 is a diagrammatic representation of a ship propulsion system in which under normal conditions each generator is connected to one motor and in which under abnormal conditions one generator is connected to two motors. As indicated in this figure, means are provided for limiting the speed and output of a generator when it is connected to two motors so as to prevent overloading of the generator under abnormal operating conditions. In Fig. 2 of the drawings a system is diagrammatically represented in which under normal conditions one generator is used to supply power to two propeller motors and in which under abnormal conditions one generator is connected to one motor. In this figure means are represented for limiting the speed and output of the generator when it is connected to a single motor in order to prevent overloading of the motor.

In Fig. 1 propellers 1 and 2 are driven by motors 3 and 4 supplied with energy from generators 5 and 6. These generators are driven by prime movers 7 and 8 illustrated in the drawings as steam turbines. Each of these turbines is under the control of adjustable speed governing mechanisms 9 and 10 which are illustrated as having the construction shown in the patent to Emmet 1,137,308, granted April 27, 1915, and assigned to the same assignee as the present application. By means of these speed governing mechanisms as will become apparent from a consideration of the above referred to patent, it is possible to adjust the speeds of the turbines and approximately maintain any desired operating speeds. The speed settings for the turbines are determined by the positions of speed levers 11 and 12 which are connected through rods 13, 14 and cranks 15, 16 to the actuating rods 17 and 18 of the governors 9 and 10.

The free range of operation of levers 11 and 12 is determined by low speed stops 19, 20 and high speed stops 21 and 22 which by engagement with pins 23 and 24 on speed levers 11 and 12 limit the range of operation of these levers. The construction and arrangement of the low speed stops 19 and 20 may correspond to that shown in the patent to Alexanderson 1,579,051, granted March 30, 1926, and assigned to the same assignee as the present application. As pointed out in that patent, these low speed stops are provided in order to prevent movement of the speed adjusting means to a position below that where maneuvering operations of the ship may be successfully accomplished. In the drawing these stops are illustrated as spring pressed to operative position from which they can be moved against the action of the spring when it is desired to operate the ship at speeds below the maneuvering speed determined by these stops. The high speed stops 21 and 22 may be thrown from an operative to an inoperative position either manually or automatically. In the drawings the operation of these stops has been illustrated as being automatically controlled in response to the operation of the setup switches by means of which the various interconnections of the generators and motors are accomplished.

The arrangement and manner of operation of these stops will be further described below.

The motors 3 and 4 have been illustrated as induction motors with wound secondaries which are connected through slip rings 25 and 26 to controlling rheostats 27 and 28. Generators 5 and 6 are connected to these motors through a group or setup switches 29 and reversing switches 30 and 31. Generators 5 and 6 have been illustrated as three-phase synchronous machines receiving direct current excitation from busses 32 through slip rings 33 and 34. In order to simplify the diagram only one of the connections from each motor and generator is illustrated and only so many of the setup switches 29 as are necessary to indicate the connections between the motors and generators are illustrated in the drawings.

When the setup switch is in the position illustrated in Fig. 1 each generator is connected to its corresponding motor. Generator 5 is connected to motor 3 through conductor 35, segment 36, switch 37, conductor 38, reversing switches 30 and conductor 39. Generator 6 is likewise connected to its motor 4 through conductor 40, switch segment 41, switch 42, conductor 43, reversing switch 31 and conductor 44. When switch bar 45 which connects switches 37, 42 and 46 is moved to the left the connections between generator 6 and motor 4 above described are interrupted at switch 42. The connection between generator 5 and motor 3 is not interrupted by reason of the extension of segment 36 to the left which serves to complete the circuit through switch 37. Switch 46 which is moved toward the left at the same time switches 37 and 42 are moved to the left completes a connection between motor 4 and generator 5 as follows: Through conductor 35, switch segment 36, switch 37, conductor 47, contact 48, switch 46, conductors 49 and 43, reversing switch 31 and conductor 44. Movement of the switch bar 45 to the left also causes a corresponding movement of the interlock bar 50 which may be connected to the switch bar 45 through one of the switch elements such as 46 as illustrated in the drawings. Movement of this bar to the right actuates a crank 51 which operates a rod 52 provided at its end 53 with an extension that engages a corresponding extension on the high speed stop 21 and moves stop 21 into operative position. It will thus be seen that when two motors 3 and 4 are connected to one generator 5, under which conditions it is possible to overload the generator, the speed of its prime mover is limited by means of a stop which is placed in operation when the setup switch is moved in order to connect these motors to the generator. In like manner, if the setup switch 29 is thrown to the right in order to connect motors 3 and 4 to generator 6 stop 22 is moved into operative position in order to limit the speed of the prime mover 8 and prevent overloading of generator 6.

Low speed stops 19 and 20 may be provided with adjusting means enabling them to be set at any desired maneuvering speed. High speed stops 21 and 22 are illustrated as adjustable since it is impossible to accurately predict the load that will be obtained on a propeller for a given speed. Adjustment is secured by means illustrated in the drawings as screws 54 and 55 inserted in the ends of the stops 21 and 22 which are adapted to engage the pins 23 and 24 of levers 11 and 12. It is, of course, apparent that the adjusting means may be located on the levers 11 and 12 instead of the stops.

The arrangement in Fig. 1 just described has as its purpose the protection of the generators from overload. The arrangement shown in Fig. 2 differs therefrom in that the arrangement illustrated there has as its purpose the protection of the motors from overload. In Fig. 2 only so much of the control equipment is illustrated as is necessary in conjunction with the arrangement shown in Fig. 1 to understand the invention. Generators 5' and 6' driven by prime movers which are governed as in Fig. 1 are connected through a setup switch 29' and reversing switches 30' and 31' to propelling motors such as 3 and 4 illustrated in Fig. 1. The turbines by means of which generators 5' and 6' are operated are under the control of speed levers 11' and 12' as in Fig. 1. As in Fig. 1, the low speed position of stop levers 11' and 12' is determined by stops 19' and 20' which in their operative positions engage pins 23' and 24' on levers 11' and 12'. The high speed position of the prime movers is likewise determined in Fig. 2 by stops 21' and 22' which in their operative positions engage pins 56 and 57 on levers 11' and 12'. Stops 21' and 22' are under the control of mechanism operated by an interlocking bar 50' such as described in conjunction with the illustration shown in Fig. 1.

In Fig. 2 the setup switch 29' is shown in the abnormal position in which each generator is connected to one motor and there is a possibility of overloading the motor if the generator is brought up to its maximum speed. Generator 5' is connected to its corresponding motor through conductors 35', switch segment 36', switch 37', conductor 38', reversing switch 30' and conductor 39'. Motor 6' is in a similar manner connected to its propeller motor. If the switches are thrown to the left by operating the switch bar 45' both motors are connected to generator 6', the connections being as follows: From generator 6' through conductors 40' and 58, contacts 59, switch 46', conductors 60 and 38', switches 30' and conductor 39' to one motor and through conductors 40', switch segment 41', switch 42', conductor 43', switches 31' and conductor 44' to the other motor. At the same time the interlock bar 50' is moved to the right by reason of its interconnection through switch 46' with switch bar 45'. This movement of the interlock bar 50' elevates the rod 61 and permits the stop 22' to fall into an inoperative position under which condition the speed lever 12' may be moved to the high speed position when controlling the prime mover driving generator 6' which is now connected to two motors. Movement of the switch bar 45' to the right connects generator 5' to both motors and frees the control lever 11' from limited movement by reason of stop 21' and permits the prime mover connected to generator 5' to be brought up to its full speed.

It is, of course, apparent that the specific arrangements illustrated and described above may be modified without departing from the spirit and scope of the present invention. Instead of using steam driven prime movers 7 and 8 other types of prime movers may be used. Different speed control means than that illustrated may be used. The dynamo-electric means for connecting the prime movers to the propellers may be direct current apparatus instead of alternating current apparatus as illustrated. The specific manner of interlocking the setup switch with the speed control means associated with each prime mover may be greatly altered according to the conditions encountered in use. Additional interlocking means may be provided in order to prescribe any desired method of controlling the ship. Consequently, I wish to have it understood that my invention is not limited to the specific arrangements described since many variations and modifications will be obvious to those skilled in the art and I, therefore, aim in the appended claims to cover all such variations and modifications as fall within the true spirit and scope of my invention.

What I claim as new and desire to secure by Letters Patent of the United States, is:—

1. A power system comprising a plurality of generators, a plurality of motors, a plurality of prime movers for driving said generators, means for independently controlling the speeds of said prime movers, means for limiting the speeds of said prime movers, means for connecting said generators and motors in one relation for normal operation and in a different relation for abnormal operation, and means operated by said last mentioned means for operating said speed limiting means when said generators and motors are connected for abnormal operation in order to limit the output of said generators.

2. A power system comprising a plurality of generators, a plurality of motors, means for connecting one or a plurality of said motors to one of said generators, prime movers for driving said generators, means for controlling the speeds of said prime movers, removable means for limiting the speeds of said prime movers and means operated by the means for interconnecting said generators and motors for moving said speed limiting means into operative position in order to limit the speed and output of said generators in accordance with the load capacities of said generators or motors when the connection is such that one of said units may be overloaded.

3. A power system comprising a plurality of generators, a plurality of motors, each of which is capable of absorbing the complete output of one of said generators, means for connecting one or both of said motors to one of said generators, means for limiting the output of said generator, and means for rendering said last mentioned means effective when both of said motors are connected to said generator.

4. A power system comprising a plurality of generators, a plurality of motors, each of which is capable of absorbing the complete output of one of said generators, means for connecting one or both of said motors to one of said generators, a prime mover for said generator, means for controlling the speed of said prime mover, means for limiting the speed of said prime mover, and means for rendering operative said last mentioned means when both of said motors are connected to one of said generators.

5. A ship propulsion system comprising a plurality of propellers, a plurality of prime movers, dynamo-electric means for connecting said prime movers to said propellers, switching means for changing the number of propellers driven by one prime mover through the agency of said dynamo-electric means, means operated by said switching means for limiting the speeds of said prime movers to limit the speeds of said propellers so that no part of said dynamo-electric means is overloaded when by reason of the interconnections between said prime movers and said propellers the load capacity of part of said dynamo-electric means is greater than the load capacity of the rest of said dynamo-electric means.

6. An electric ship propulsion system comprising a plurality of propellers, a plurality of motors for driving said propellers, a plurality of generators for supplying said motors, a plurality of prime movers for driving said generators, means for controlling the inter-connection of said generators and motors, governors for said prime movers, control means for said governors the position of which determines a prime mover's speed, stop mechanisms for said control means movable to positions which limit the speeds of said prime movers to values such that no motor or generator interconnected by the control means is overloaded, and means operated by said means for controlling the interconnection of said generators and motors for moving said stop mechanisms to positions limiting the speeds of said prime movers when the connections are such that a generator or motor may be overloaded and to positions permitting further increases in speed of said prime movers when the motor and generator connections are altered and the conditions for overloading changed.

7. A ship propulsion system comprising two generators, two propellers, a motor for each of said propellers which is capable of absorbing the complete output of either of said generators, means for interconnecting said generators and motors, a prime mover for driving each of said generators, a governor for each of said prime movers, control means for each of said governors the position of which determines the speed of its associated prime mover, a stop mechanism for each of said control means movable to a position which determines the speed of each of said prime movers at which its associated generator is fully loaded when connected to both of said motors, and means for moving said stop mechanism into operative position when a generator driven by the prime mover affected thereby is connected to two motors and for moving said stop mechanism into inoperative position to permit further increases in speed of said prime mover when said generator is connected to one of said motors.

8. A ship propulsion system comprising a plurality of generators, a plurality of propellers, a motor for each of said propellers each of which is capable of absorbing the complete output of one of said generators, a prime mover for each of said generators, means for controlling the speed of said prime movers, means for limiting the speeds of said prime movers, and means for actuating said last mentioned means of any prime mover when a plurality of said motors are connected to a generator driven by said prime mover.

9. A ship propulsion system comprising a plurality of propellers, a plurality of motors for driving said propellers, a plurality of generators for supplying said motors, a plurality of prime movers for driving said generators, means for interconnecting said generators and motors, means including adjustable speed governing mechanisms for varying the speeds of said motors by adjusting the admission of motive fluid to said prime movers and for approximately maintaining any desired operating speeds of said prime movers, stop mechanisms for said governing mechanisms for limiting the speeds and power outputs of said prime movers, means for changing the interconnection of said motors and generators and means operated by said last mentioned means for moving said stop mechanisms into operative position to limit the load on said generators and motors to the maximum that the most heavily loaded unit can carry when the connections are such that one of said units may be overloaded.

10. A ship propulsion system comprising a plurality of propellers, a plurality of prime movers, dynamo-electric means for connecting said prime movers to said propellers, switching means for connecting said dynamo-electric means in one relation for normal operation and in a different relation for abnormal operation, means for limiting the speeds of said prime movers and means for rendering operative said last-mentioned means when said switching means is operated to connect said dynamo-electric means for abnormal operation.

In witness whereof, I have hereunto set my hand this 31st day of October, 1929.

ALEXANDER KENNEDY, Jr.